United States Patent [19]

Piosenka et al.

[11] Patent Number: 4,598,170
[45] Date of Patent: Jul. 1, 1986

[54] SECURE MICROPROCESSOR

[75] Inventors: Gerald V. Piosenka, Scottsdale; Barry B. Mead, Mesa, both of Ariz.

[73] Assignee: Motorola, Inc., Schaumburg, Ill.

[21] Appl. No.: 611,560

[22] Filed: May 17, 1984

[51] Int. Cl.$^4$ .............................................. H04L 9/00
[52] U.S. Cl. ................................ 178/22.08; 178/22.09
[58] Field of Search ................ 178/22.08, 22.09, 22.19

[56] References Cited

U.S. PATENT DOCUMENTS

| | | | |
|---|---|---|---|
| 4,105,156 | 8/1978 | Dethloff | 178/22.08 |
| 4,211,919 | 7/1980 | Ugon | 178/22.08 |
| 4,246,638 | 1/1981 | Thomas | 178/22.08 |
| 4,278,837 | 7/1981 | Best | 178/22.09 |
| 4,306,289 | 12/1981 | Lumley | 178/22.08 |
| 4,433,207 | 2/1984 | Best | 178/22.09 |
| 4,446,519 | 5/1984 | Thomas | 178/22.08 |
| 4,458,315 | 7/1984 | Uchenick | 178/22.08 |

OTHER PUBLICATIONS

"Combatting Software Piracy by Encryption and Key Management", by Albert & Morse, IEEE, 4/84.

*Primary Examiner*—Salvatore Cangialosi
*Assistant Examiner*—Aaron J. Lewis
*Attorney, Agent, or Firm*—Raymond J. Warren

[57] ABSTRACT

An apparatus and method is disclosed for the protection of computer programs through the use of the principles of conditional inversion and permutation. These security features are designed as part of the chip in a fashion to minimize the changes required to any existing microprocessor design and to be transparent to firmware execution. The programs are first encrypted by permutation which reorders the lines according to an allocated scheme and then conditionally inverted through a set of dual input exclusive OR gates. The reordering of lines in the permutator and the conditional inversion in the inverter are accomplished through the use of variables some of which are permanently prestored in the microprocessor and some of which are entered by the programmer.

18 Claims, 10 Drawing Figures

SECURE MICROPROCESSOR

BACKGROUND OF THE INVENTION

1. Field of the Invention

This invention relates, in general, to computer program security and, more particularly, to cryptographic microprocessors.

2. Description of the Background

Methods and apparatus for preventing firmware piracy are many and varied. One method of preventing firmware piracy is found in the Best patent (U.S. Pat. No. 4,278,837) issued on July 14, 1981. The Best patent discloses a method of preventing program piracy in which programs are stored in a ciphered form. A cryptomicroprocessor then deciphers the programs step-by-step as the program is executed. However, in the Best patent, each program is encrypted using a different variable and, as a result, does not facilitate use of low cost, mass production devices, such as masked ROMs. An alternative, to allow mass production of the Best approach, is to encrypt each program using a single common variable. This method prevents duplication of the plain text version of the program but does not prevent simple duplication by a pirate of the ciphered text. Since all of the programs have a common variable the copied ciphered text may be used on any microprocessor that is encrypted in the same manner.

SUMMARY OF THE INVENTION

Accordingly, it is an object of the present invention to provide an apparatus and method of encrypting a computer program that will be sufficiently secure such that a prospective pirate must expend considerable resources of an economic, technical and time nature so as to make duplication unattractive.

A further object of the present invention is to provide an apparatus and method of encrypting a computer program such that if it should be deciphered the consequences of having the unencrypted program are minimized.

Still another object of the present invention is to provide an apparatus and method that can be adapted to low cost, mass production giving a more economical process.

Yet another object of the present invention is to provide an apparatus and method that will prevent the use of the device with unauthorized programs.

The above and other objects and advantages of the present invention are provided by an apparatus and method of implementing the security features as an integral part of the microprocessor LSI chip.

A particular embodiment of the present invention uses the principles of conditional inversion and permutation. These security features are designed in as part of the chip in a fashion to minimize the changes required to any existing microprocessor design and to be transparent to firmware execution, no additional clock delay. First the program is encrypted by permutation which reorders the lines according to an allocation scheme. In a data bus of N digits there are N! possible allocations. Next, conditional inversion is accomplished through a set of N dual input exclusive OR gates. The first input of each exclusive OR gate receives the data from the permutator. The second input of each exclusive OR gate is coupled to receive a preselected variable that will serve to conditionally invert the data. To recover the data the reverse process is used.

DETAILED DESCRIPTION OF THE INVENTION

Figures 1, 2:
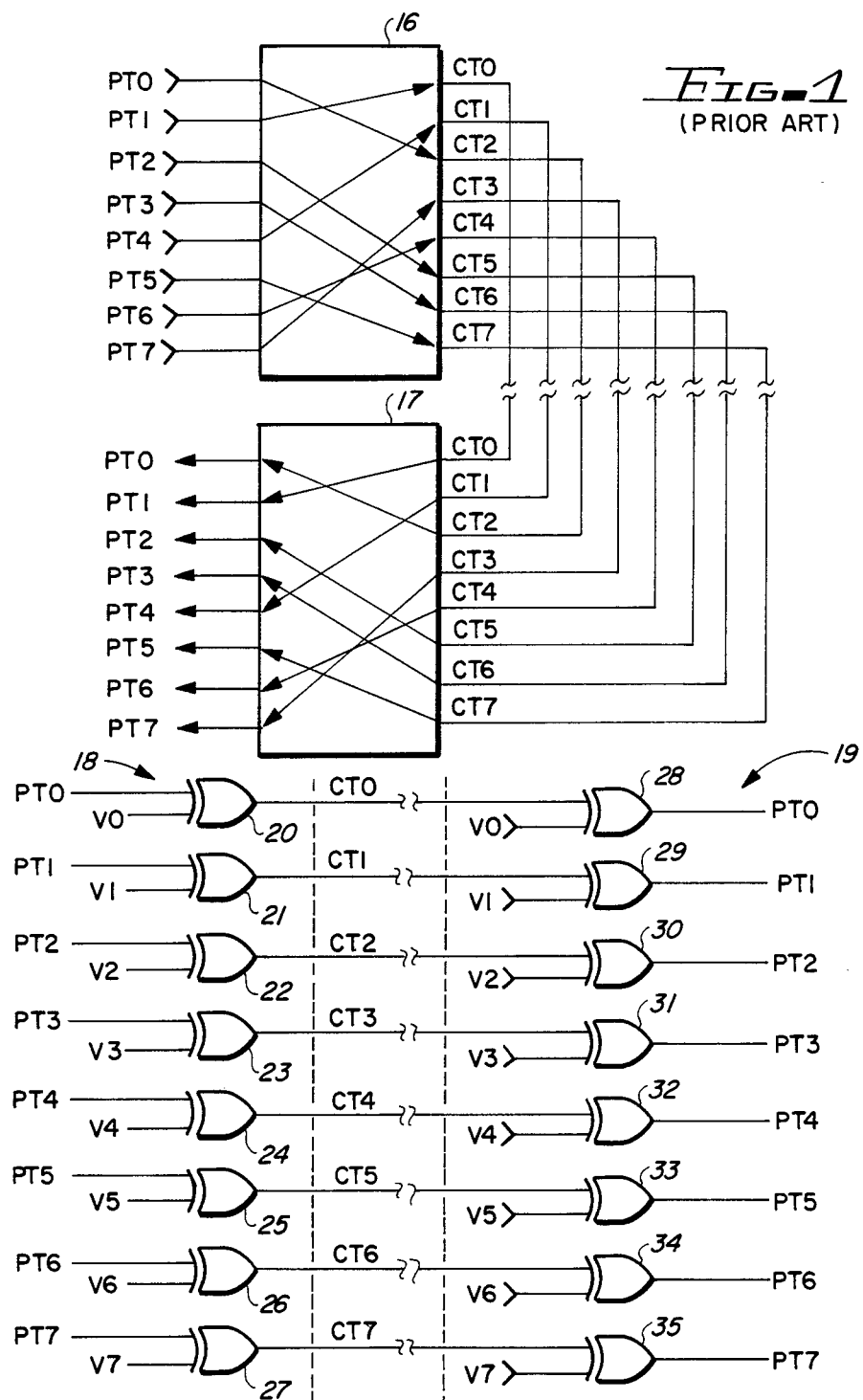
FIG. 1 is a prior art illustration of the permutor concept showing the encrypting and decrypting function.
FIG. 2 is a prior art illustration of a conditional inversion algorithm showing the encrypting and decrypting functions.

Referring to the diagram of FIG. 1 a prior art diagram of the permutor concept is illustrated. A permutor, generally designated 15, is illustrated having an encryptor 16 and a decryptor 17. Unencrypted data, or plain text, is denoted by PT0–PT7. The plain text is operated on by encryptor 16 to produce encrypted data CT0–CT7. Encryptor 16 simply reorders the plain text lines. For a bus of N digits there are N! possible allocations. Taking N as 8 would give 40,320 possible allocations. Decryptor 17 will restore the original data. Decryptor 17 is identical to encryptor 16. In decryptor 17 the encrypted data CT0–CT7 is input to the side it was output from in encryptor 16.

Referring now to FIG. 2 a prior art illustration of a conditional inversion algorithm is shown having an encryptor 18 and decryptor 19. Here, PT0–PT7 represents the plain text data being encoded and CT0–CT7 represents the encrypted data. A variable V0–V7 is used to conditionally invert the plain text. Encryptor 18 consists of N dual input exclusive OR gates 20–27, where N is the number of bits in the plain text. Plain text data is input into the first inputs of exclusive OR gates 20–27 and the variable is input to the second inputs of exclusive OR gates 20–27. To decode the encrypted data (CT0–CT7) a second set of dual input exclusive OR gates 28–35 is used. The encrypted data, CT0–CT7, is input to the first input of exclusive OR gates 28–35 and the variable, V0–V7, is input to the second inputs of exclusive OR gates 28–35. This reconstructs the original plain text PT0–PT7. This process has $2^N$ possible codes available where N is the number of bits. Taking N as 8 gives 256 possible codes.

Figure 3:
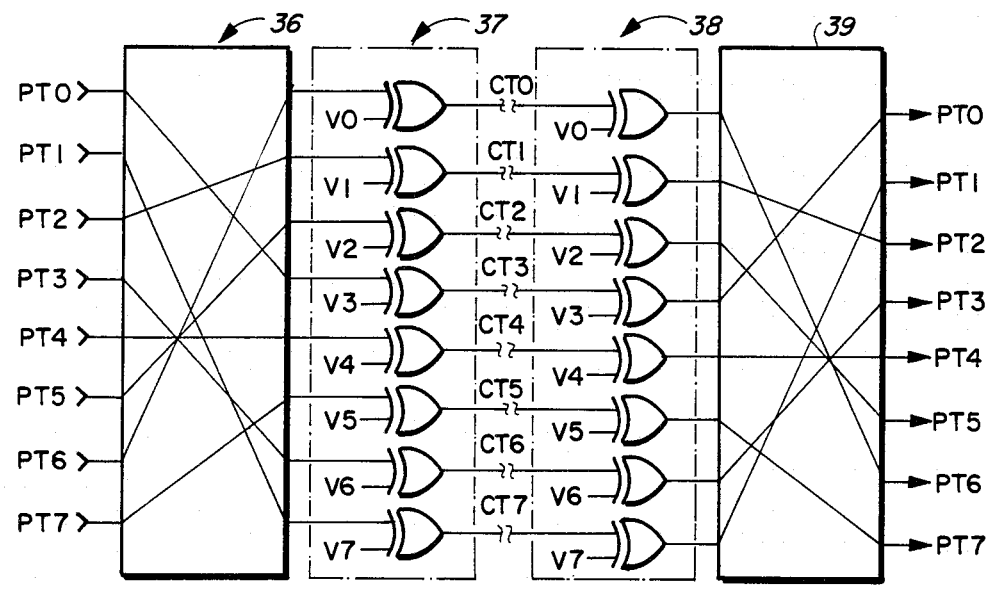
FIG. 3 is an illustration of the permutor concept of FIG. 1 combined with the conditional inversion algorithm of FIG. 2.

Referring now to FIG. 3, an illustration of the permutor concept of FIG. 1 is combined with the conditional inversion algorithm of FIG. 2 in cascade. As illustrated the plain text data (PT0–PT7) is input to a permutor encryptor 36 rearranging the data bits. These are then transmitted to a conditional inversion encryptor 37 and combined in a set of exclusive OR gates with a variable V0–V7. This produces the encrypted data CT0–CT7. To decipher this the encrypted data CT0–CT7 is transmitted to a conditional inversion decryptor 39 and combined in a second set of exclusive OR gates with the variable V0–V7. This data, from decryptor 38, is then transmitted to a permutor decryptor 39 where the plain text data PT0–PT7 is reassembled.

Figure 4:
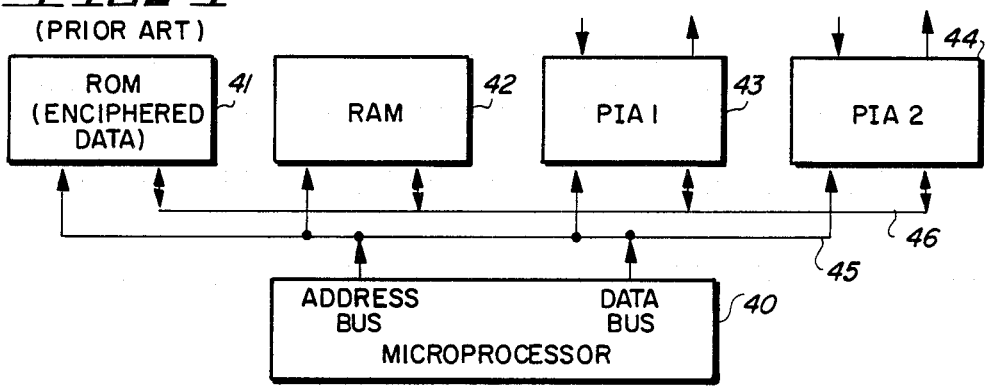
FIG. 4 is a block diagram of a prior art microprocessor.

Referring now to FIG. 4 a block diagram of a prior art microprocessor 40 is illustrated. Microprocessor 40 will communicate with a ROM 41, a RAM 42, and various peripheral devices 43 and 44 through an address bus 45 and data bus 46. The encrypted program would normally be stored in ROM 41. A problem arises here in that microprocessor 40, while communicating with ROM 41 using encrypted data, must communicate with RAM 42 and peripherals 43 and 44 in unencrypted data.

Figure 5:
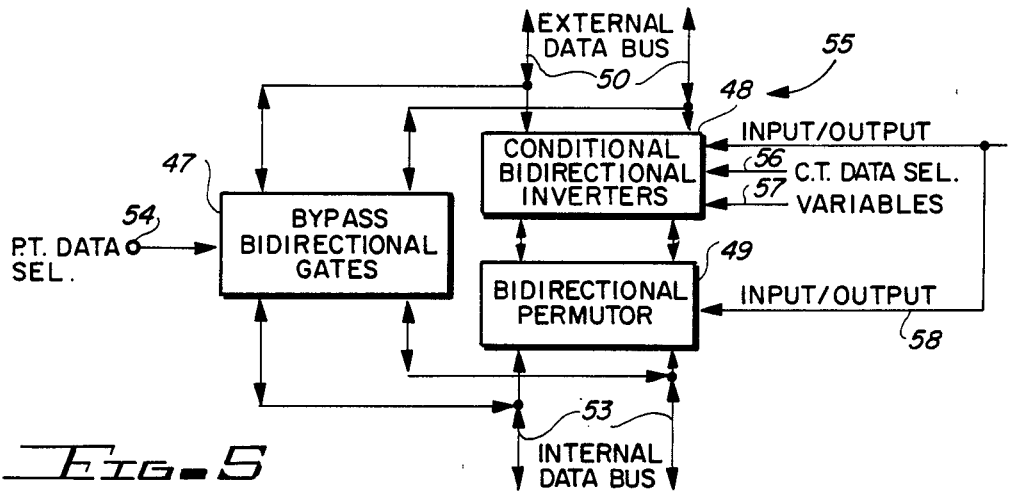
FIG. 5 is a simplified block diagram of the data bus circuitry to a microprocessor embodying the present invention.

Referring now to FIG. 5 a simplified block diagram of the data bus circuitry, generally designated 55, embodying the present invention is illustrated. Circuit 55 contains a set of bypass bidirectional gates 47, a conditional bidirectional inverter 48 and a bidirectional permutor 49. These are connected externally by data bus 50 and internally by data bus 51. When data is to be input as plain text a PT data select line 54 enables bypass gates 47 and a CT data select line 56 inhibits bidirectional (input and output) inverters 48. When encrypted data is received line 54 inhibits bypass gates 47 and line 56 enables bidirectional inverter 48. Bidirectional inverter 48 operates on the encrypted data from external bus 50, using a variable previously entered on a line 57, producing outputs driving permutor 49. Permutor 49 reorders the lines to provide the plain text data to internal data bus 53. The reverse operation is used to encrypt data. The plain text data is transmitted along internal bus 53 to permutor 49 where the lines are mixed. This signal is then transmitted to bidirectional inverter 48 and out external bus 50. Bidirectional inverter 48 and bidirectional permutor 49 have an input/output line 58 coupled to each to regulate the flow of data through the encryptor/decryptor circuitry.

Figure 6:
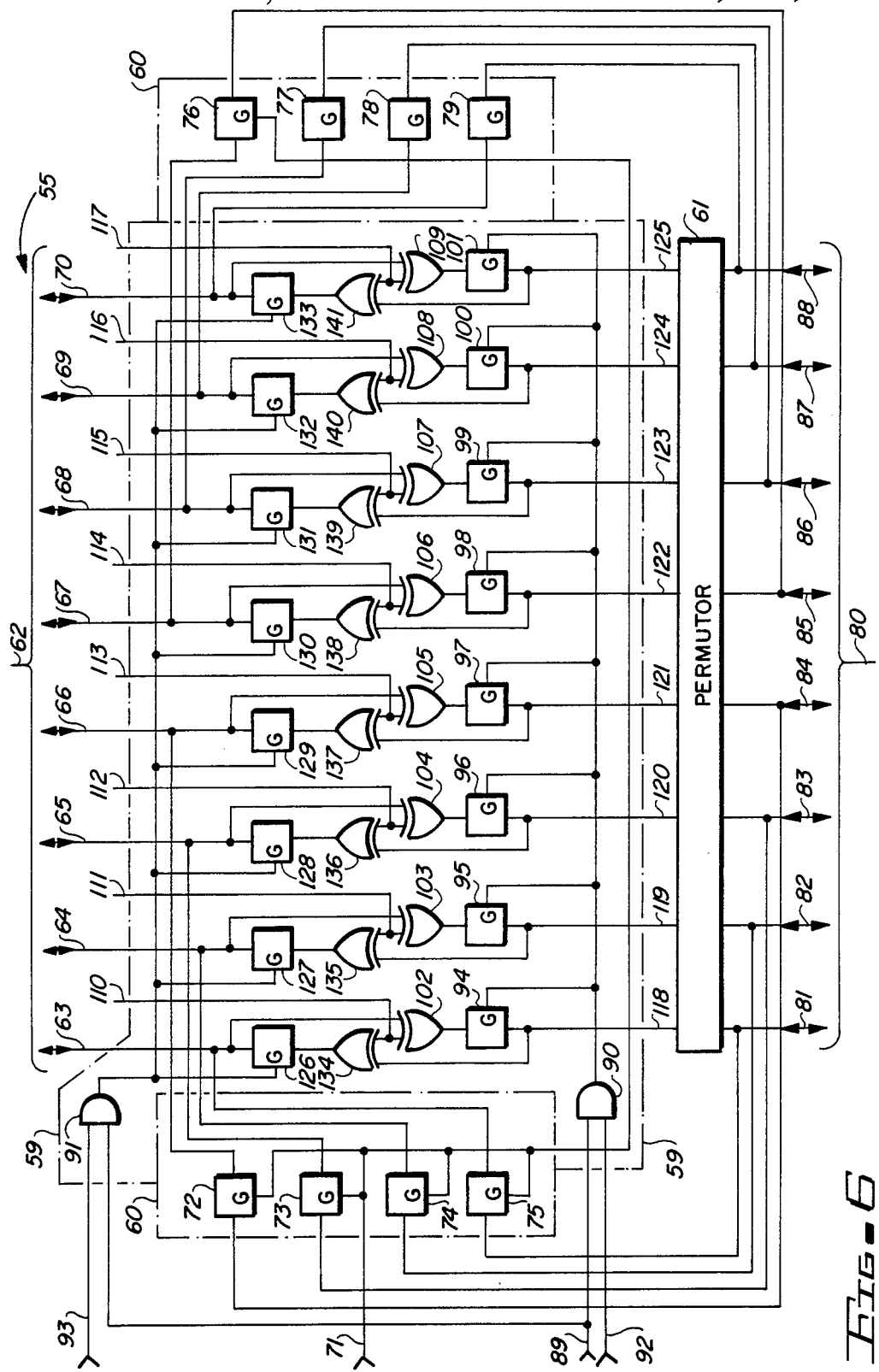
FIG. 6 is a detailed block diagram of FIG. 5.

Referring now to FIG. 6 a more detailed block diagram of FIG. 5, circuit 55, is illustrated. This diagram has a conditional bidirectional inverter 59, a bypass bidirectional circuit 60 and a permutor 61. An external bus 62 is coupled to a set of I/O lines 63–70 which are coupled to bidirectional inverter 59 and bypass circuit 60. A PT data select line 71 is coupled to bypass circuit 60. When plain text data is transmitted to circuit 55, PT data select line 71 enables a set of bidirectional gates 72–79. This allows the plain text to be transmitted through bypass circuit 60 to an internal bus 80 along a set of data lines 81–88. The same operation is performed if plain text data is to be transmitted from internal bus 80 to external bus 62.

When encrypted data is to be transmitted PT data select line 71 inhibits gates 72–79 and prevents the unencrypted data on internal bus 80 from passing through bypass circuit 60. Bidirectional inverter 59 has a CT data select line 89 that enables (inhibits) bidirectional inverter 59 when encrypted (plain text) data is to be transmitted. CT data select line 89 is coupled to one input of a pair of dual input AND gates 90 and 91. Gate 90 has a second input coupled to an input enable line 92. When CT data line 89 and input enable line 92 are on, AND gate 90 is enabled to allow reception and decoding of input ciper data. Gate 91 has a second input coupled to an output enable line 93. When CT data select line 89 and output enable line 93 are on AND gate 91 is enabled to allow transmission of enciphered data. The output of AND gate 90 is coupled to bidirectional gates 94–101 such that when AND gate 90 is enabled gates 94–101 are enabled. Gates 94–101 are coupled to the outputs of a set of dual input exclusive OR gates 102–109, resp. One input of exclusive OR gates 102–109 is coupled to line 63–70, resp. The other input of exclusive OR gates 102–109 is coupled to a set of lines 110–117, resp., which carry a variable input. The variable input on lines 110–117 is combined with the encrypted data input on lines 63–70 to perform the inversion algorithm as decryptor 19 in FIG. 2. The signals from exclusive OR gates 102–109 are then transmitted to gates 94–101. Since gates 94–101 are enabled by AND gate 90 the signals are allowed to pass through gates 94–101 along lines 118–125 to permutor 61. Permutor 61 then rearranges the lines and produces the plain text output on lines 81–88.

When encrypted data is to be transmitted from internal bus 80 to external bus 62 CT data select line 89 and output enable line 93 are turned on and input enable line 92 is turned off. This enables gate 91 which in turn enables a set of bidirectional gates 126–133. Gates 126–133 are coupled to the output of a set of dual input exclusive OR gates 134–141, resp. The first inputs of exclusive OR gates 134–141 are coupled to lines 118–129, resp., from permutor 61. The second inputs of exclusive OR gates 134–141 are coupled to variable lines 110–117. These inputs produce an output from exclusive OR gates 134–141 that is transmitted through gates 126–133 and out of circuit 55 on lines 63–70. As the data from the permutor 61 passes through bidirectional inverter 59, gates 134–141 perform the inversion algorithm as encryptor 18 of FIG. 2.

Figure 7:
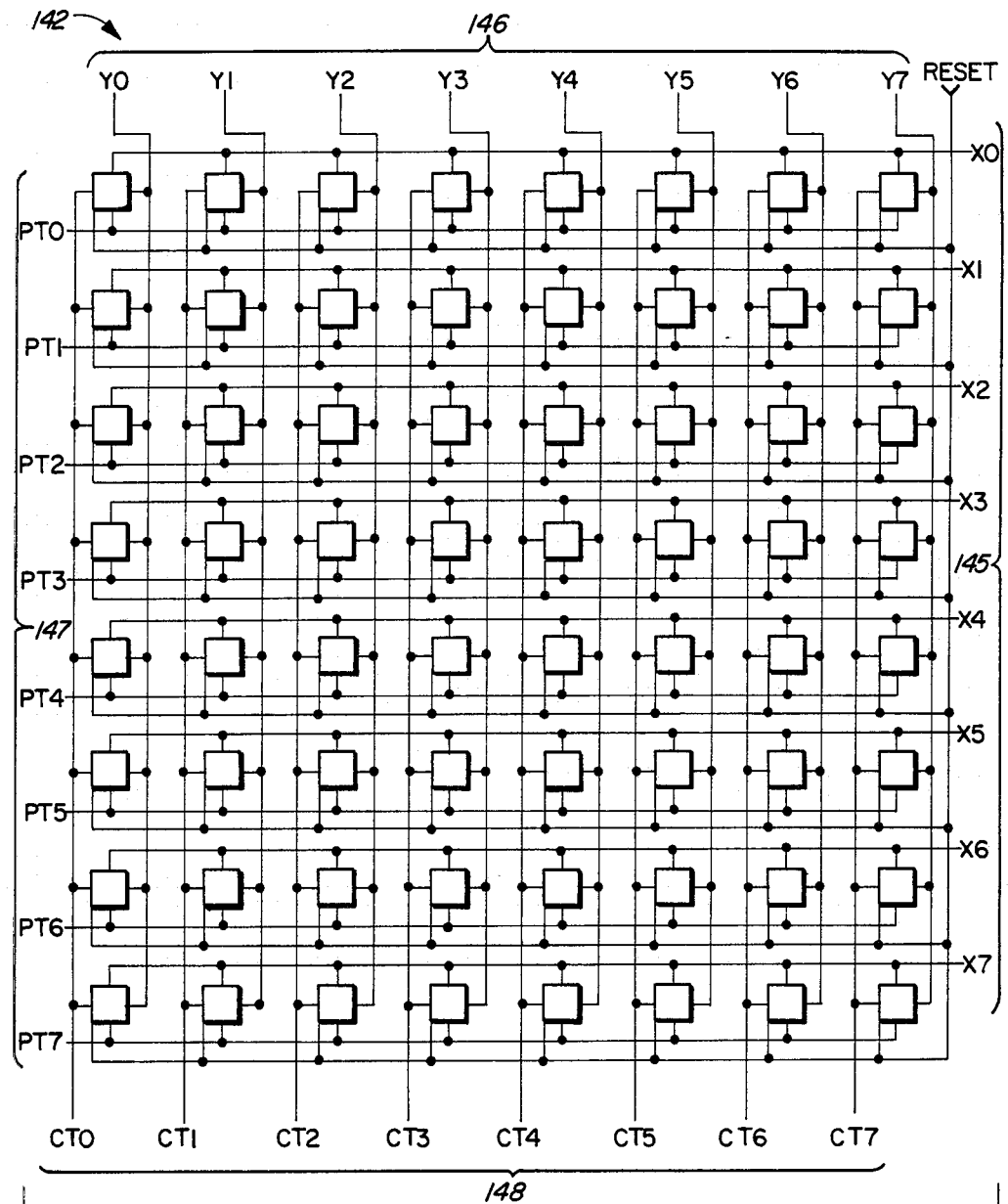
FIG. 7 is a block diagram of a permutor array embodying the present invention.
Figures 7A, 7B:
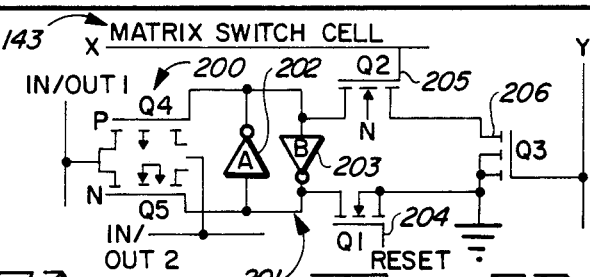
FIG. 7A is a block diagram of a single cell of the permutor array of FIG. 7.
FIG. 7B is a schematic diagram of the single cell of FIG. 7A.

Referring now to FIG. 7 a block diagram of a permutor array, generally designated 142, embodying the present invention is illustrated. Permutor 142 is made of an array of matrix switch cells 143 as illustrated in FIG. 7A. As shown in FIG. 7A each gate has a reset line 144, an X variable input line 145, a Y variable input line 146, a first I/O data line 147 and a second I/O data line 148. FIG. 7B illustrates a schematic diagram of the matrix switch cell, generally designated 143, of FIG. 7A. Cell 143 consists of an analog transmission gate 200 operated by a latch 201 composed of inverters 202 and 203. A transistor 204 provides for resetting latch 201 which disables transmission gate 200. A pair of transistors 205 and 206, when activated simultaneously, enable transmission gate 200. Gates 143 are then coupled to an 8×8 crosspoint switch consisting of 64 cells as illustrated in FIG. 7. Gates 143 are programmed by first resetting the X inputs X0–X7 to logic 0 levels and pulsing reset line 144 to a logic 1. Next, one of the Y variable lines 146 is set high. This will determine which of the first I/O lines 148 (CT0–CT7) will be connected to a second I/O line 147 (PT0–PT7). When Y line 146 is set high, X line 145 is pulsed programming the appropriate switch. One example of this would be setting Y2 high and then pulsing X0 high. This will enable the X0, Y2 gate and allow data to pass from PT0 to CT2 and vice versa. This step is then repeated for rows X1–X7 until all have been programmed. When completed only one gate in each row will be enabled.

Figure 8:
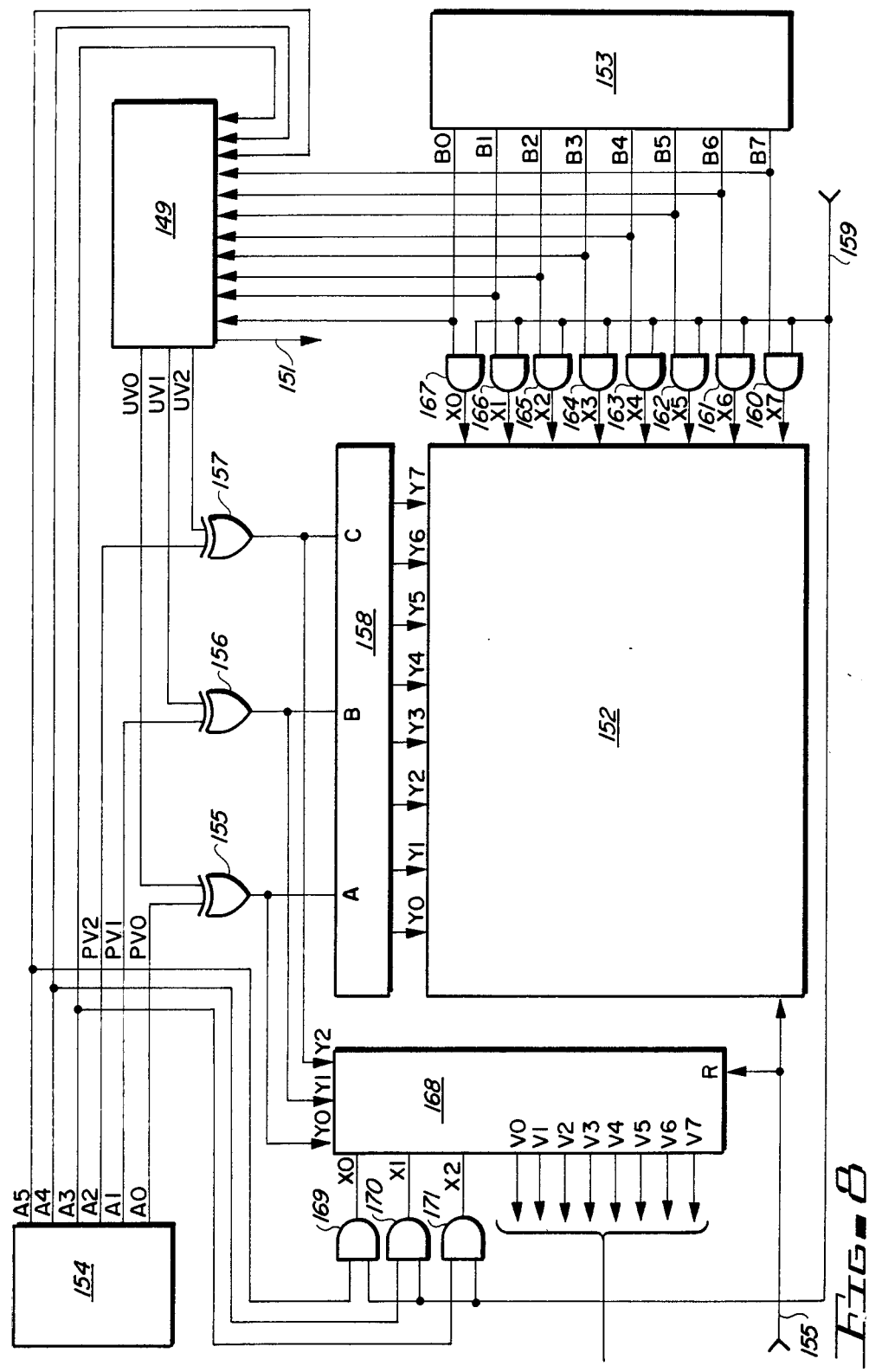
FIG. 8 is a block diagram of variable circuitry embodying the present invention.

Referring now to FIG. 8 a block diagram of variable circuitry embodying the present invention is illustrated. The variables are provided by a special circuit added to the processor LSI chip. The processor LSI chip has an EPROM (electrically programmable read only memory) 149 that is used to store a unique variable (UV). EPROM 149 must have K bits for a data bus of N width where, $K=N(M+1)$ and $2^M \geq N$. For an 8 bit (N) wide bus $M \geq 3$. Taking M as 3 results in K being 32 bits. EPROM 149 must be such that the array can be conveniently programmed using the processor data bus (B0-B7). EPROM 149 also has a cipher line 151 which is programmed to the unerased state in order for the processor to operate in the cipher mode. EPROM 149 may also have a fuse link (not shown) which, if blown, will prohibit the unique variable from being altered. The fuse link allows the processor manufacturer to test the device before delivering it to the OEM (original equipment manufacturer). This allows the OEM to assign the unique variable to each processor and blow the fuse link to prevent alteration. A record is then kept of the unique variable matched with the processor external serial number.

A second variable, the traffic variable (TV), is used to program a permutor 152 and drive a conditional inverter, see FIG. 6. The traffic variable is obtained by a mathematical operation performed on the unique variable in EPROM 149 and a program variable obtained from the OEM. The mathematical operation uses the unique variable in combination with the program variable to generate the traffic variable which is then used to decrypt the program purchased from the OEM. The programs will be sold in an encrypted form using a common traffic variable thereby enabling use of low cost mass produced common ROM.

The variable circuitry of FIG. 8 may be designed by numerous methods. The circuitry shown here is designed to minimize the impact to an existing process or design. Here use is made of two existing processor registers, 153 and 154, which are externally loaded in a conventional manner. To program permutor array 152 the entire array is reset by a signal from a reset line 155. This signal can be generated by a special instruction code in the processor instruction set. To program the circuit the processor, operating in the plain text mode, loads register 154 with the first three bits of the program variable. Register 153 is then loaded with all logic 0's except bit B0 which is set to a logic 1. This selects column 1 of EPROM 149 which provides the first three bits of the unique variable, UV0-UV2, stored in EPROM 149. A set of dual input exclusive OR gates 155-157 have a first set of inputs PV0-PV2 coupled to register 154 and a second set of inputs UV0-UV2 coupled to EPROM 149. Exclusive OR gates 155-157 combine the program variable (PV0-PV2) and the unique variable (UV0-UV2) to generate the traffic variable (TV0-TV2). The outputs of exclusive OR gates 155-157 are then coupled to a 3-to-8 line decoder 158. Decoder 158 operates on the traffic variable from exclusive OR gates 155-157 to produce an output on one of eight Y lines coupling decoder 158 to permutor array 152. A variable load strobe line 159 is then pulsed, through a special program instruction, to a logic 1 which is coupled to an input of a set of dual input AND gates 160-167. The second input of AND gates 160-167 is coupled to lines B0-B7 of register 153. As line B0 is high, see above, when strobe line 159 is pulsed the input X0 to permutor 157 goes high causing the gate at point X0,YN to be set, N being the Y input from decoder 158. Register 154 is then loaded with the next three bits of the program variable and register 153 is shifted one bit (B1) in the direction of the most significant bit. When strobe line 159 is pulsed another array gate of permutor 152 is set. This is continued until all eight rows (X0-X7) of permutor 152 are programmed.

The next step is to program the variable which operates the conditional inverter. This is done in much the same way as the permutor was programmed. An eight bit latch array 168 is used to set the variable. Array 168 is reset by a pulse on reset line 155, the same as for permutor 152. The Y inputs (Y0-Y2) of array 168 are coupled to the outputs of exclusive OR gates 155-157 which provide the traffic variable (TV0-TV2) to array 168. The X inputs (X0-X2) are provided from a set of dual input AND gates 169-171, resp. The first inputs to AND gates 169-171 are coupled to the strobe line 159. The second inputs of AND gates 169-171, are coupled to lines A5-A3, resp., of register 154. Line A5 of register 154 is set high causing input X0 of array 168 to go high when strobe line 159 is pulsed. Pulsing of input X0 via gate 169 causes three latches (L1, L2 and L3) of array 168 to be set to the corresponding logic levels of Y0, Y1 and Y3 as presented by gates 155, 156 and 157, resp. The outputs from latch outputs L0, L1 and L2 appear as variable outputs V0, V1 and V2, resp. This operation is repeated for X1 and X2 of array 168 by setting A4 (A3) of register 154 high thereby setting latches L3, L4 and L5 (L6 and L7) to the corresponding logic levels $Y\phi$, Y1 and Y2 to produce variable V3, V4 and V5 (V6 and V7).

Once the variables have been set the program may be run. The processor has two modes of operation, the plain text mode and the cipher text mode. In the plain text mode all cipher circuits are disabled and the external and internal data buses are coupled through bypass gates (see FIG. 5). In the cipher mode use is made of both the bypass gate and the cipher circuitry depending on the type of instruction being executed. Instructions for processors are usually single or multiple byte with the first byte being the instruction and the subsequent byte being the data.

When operating in cipher text mode not all of the instructions or data require cipher operation. As an example the instruction of loading an accumulator (LDA) will be used. When the LDA instruction is read from memory the first byte comes from an enciphered source and must be entered through the cipher circuitry, this is true for the first byte of all instructions. The LDA instruction requires data be provided for loading into the accumulator. In the LDA immediate instruction the data to be put in the accumulator is stored in the next byte of memory. Since this is an enciphered source, both the second and first bytes require decryption and are entered through the cipher circuitry. This is true for all types of immediate instructions and instructions having only one byte.

A second type of instruction is direct addressing. Direct addressing normally has a first byte, the instruction byte, and a second byte which is the address of the stored data to be used. For this type of instruction the instruction byte and address byte are both enciphered and are entered through the cipher circuitry. The data to be obtained from the given address, depending on the address, may be stored in either the ciphered or plain text modes. There are two options on how to process these instructions. First, is to include in the first byte a code to specify that the actual data to be received is ciphered text or plain text. This method requires changing the processor instruction code but provides total flexibility. A second method would be to divide addresses into cipher or plain text banks. If the address is in the cipher memory bank the data will be decrypted. If the address is in the plain text memory bank the data will pass through the bypass gates.

The instructions using indexed addressing are handled identically to direct addressing by cipher/noncipher instructions or address partition, as described above. The instructions for outputting data operate in an analogous manner.

In addition to controlling the instructions a method must be provided that allows control of the plain text/cipher text modes by the processor. The best method is to provide this as part of the branch instructions which may be accomplished by either modification of the instruction set or partitioning of the addresses, as above. If the instructions are modified the branch instructions will have coding to set the processor in plain text or cipher text mode. If partitioning is used the use of cipher circuitry will be based on the addresses. The approach using the modification of instructions is more versatile but requires more change to the basic processor than does the partitioning method.

Interrupts also pose a problem when working with ciphered data. When an interrupt occurs the data being processed is stored into memory and the interrupt is then executed. After the interrupt the data is returned and the operation is continued. The processor must have a means of knowing whether the data returned after an interrupt is plain text or cipher text. This is accomplished by extending the status register by one bit to provide storage of a bit indicating plain text or cipher text modes at the time of the interrupt. If an interrupt occurs in the cipher text mode the data will be encrypted prior to storage. If the processor is in the plain text mode the data is stored unencrypted. The reverse process is followed when the stored data is returned.

In certain types of machines it will be desired that the processor operate only in the ciphered mode. This may be accomplished by providing a second fuse link which when blown allows operation only in the cipher mode. This prevents pirated software, even if deciphered, from operating on the machine. This will also prevent competitors from writing programs for the machine.

Thus, it is apparent that there has been provided in accordance with the invention, a device and method that fully satisfies the objects, aims and advantages set forth above.

It has been shown that the present invention provides an apparatus and method that will prevent the pirating of computer programs and that will prevent the use of other programs on a protected machine. It has also been shown that this invention can be implemented in a low cost, mass production fashion making it more economical.

While the invention has been described in conjunction with specific embodiments thereof, it is evident that many alterations, modifications, and variations will be apparent to those skilled in the art in light of the foregoing description. Accordingly, it is intended to embrace all such alterations, modifications and variations as fall within the spirit and broad scope of the appended claims.

We claim:

1. A program security device, having an external and an internal data bus, comprising:

conditional bidirectional inverter means for combining input data with a variable, said inverter means having a variable input bus, a ciphered data select, an input enable, an output enable, a first and a second input/output bus, said ciphered data select being coupled to receive a ciphered text data signal, said input enable being coupled to receive an input enabling signal, said output enable being coupled to receive an output enable signal, said first input/output bus being coupled to said external bus of said program security device;

bidirectional permutor means for rearranging data bus lines, said permutor means having a reset, a first program bus, a second program bus, a first and a second input/output bus, said reset being coupled to receive a reset signal, said first input/output bus being coupled to said second input/output bus of said inverter means and said second input/output bus being coupled to said internal data bus of said program security device; and bidirectional bypass means for bypassing said inverter means and said permutor means, said bypass means having a plain text data select, a first and a second input/output bus, said plain text data select being coupled to receive a plain text data signal, said first input/output bus being coupled to said external data bus of said program security device and said second input/output bus being coupled to said internal data select of said program security device.

2. The program security device of claim 1 wherein said conditional bidirectional inverter means comprises:

a first control gate having a first input, a second input and an output, said first input being coupled to said ciphered data select and said second input being coupled to said input enable;

a second control gate having a first input, a second input and an output, said first input being coupled to said ciphered data select and said second input being coupled to said output enable;

a first set of logic gates each having an input, an output and an enable, said enables being coupled to said output of said first control gate and said outputs being coupled to said second input/output bus of said conditional bidirecional inverter means;

a second set of logic gates each having a first input, a second input, and an output, said first inputs being coupled to said first input/output bus of said conditional bidirectional inverter means, said second inputs being coupled to said variable input bus of said conditional bidirectional inverter means and said outputs being coupled to said inputs of said first set of logic gates;

a third set of logic gates each having an input, an output and an enable, said enables being coupled to said output of said second control gate and said output being coupled to said first input/output bus of said conditional bidirectional inverter means; and a fourth set of logic gates each having a first input, a second input and an output, said first inputs being coupled to said second input/output data bus of said conditional bidirectional inverter means, said second inputs being coupled to said variable input bus of said conditional bidirectional inverter means and said outputs being coupled to said inputs of said third set of logic gates.

3. The program security device of claim 2 wherein said bidirectional permutor means comprises a first array having a reset, a first data bus, a second data bus, a third data bus and a fourth data bus, said reset being coupled to said reset of said bidirectional permutor means, said first data bus being coupled to said first input/output bus of said bidirectional permutor means, said second data bus being coupled to said second input/output bus of said bidirectional permutor means, said third data bus being coupled to said first program bus of said bidirectional permutor means and said fourth data bus being coupled to said second program bus of said bidirectional permutor means.

4. The program security device of claim 3 wherein said first array comprises a plurality of fifth logic gates each having a reset, a first input/output, a second input/output, a first program line and a second program line, said reset line being coupled to said reset of said first array, said first input/output lines being coupled to said first data bus of said first array, said second input/output lines being coupled to said second data bus of said first array, said first program lines being coupled to said third data bus of said first array and said second program lines being coupled to said fourth data bus of said first array.

5. The program security device of claim 4 wherein said bidirectional bypass means comprises a plurality of sixth logic gates each having an enable, a first input/output line and a second input/output line, said enables being coupled to said plain text data select, said first input/output lines being coupled to said first input/output bus of said bidirectional bypass means and said second input/output lines being coupled to said second input/output bus of said bidirectional bypass means.

6. The program security device of claim 5 further comprising a programming circuit having a reset, a strobe line, a cipher line, a first data bus, a second data bus, a third data bus, a fourth data bus and a fifth data bus, said reset being coupled to receive a reset signal, said strobe line being coupled to receive a strobe signal, said cipher line being coupled to receive a cipher signal, said first data bus being coupled to receive data from a processor, said second data bus being coupled to receive data from said processor, said third data bus being coupled to said first program bus of said bidirectional permutor means, said fourth data bus being coupled to said second program bus of said bidirectional permutor means and said fifth data bus being coupled to said variable input bus of said conditional bidirectional inverter means.

7. The program security device of claim 6 wherein said programming circuit means comprises:
a first register having a first data bus and a second data bus, said first data bus being coupled to said first data bus of said programming circuit means;
a seventh set of logic gates each having a first input, a second input and an output, said first inputs being coupled to said second data bus of said first register, said second inputs being coupled to said strobe input of said programming circuit means and said outputs being coupled to said third data bus of said programming circuit means;
a storage device having a cipher input, a first data bus, a second data bus and a third data bus, said cipher input being coupled to said cipher line and said first data bus being coupled to said second data bus of said first register;
an eighth set of logic gates each having a first input, a second input and an output, said first inputs being coupled to said third data bus of said storage device;
a decoder having an input data bus and an output data bus, said input data bus being coupled to the outputs of said eighth set of logic gates and said output data bus being coupled to said fourth data bus of said programming circuit means;
a second register having a first data bus, a second data bus and a third data bus, said first data bus being coupled to said second data bus of said programming circuit, said second data bus being coupled to said second inputs of said eighth set of logic gates and said third data bus being coupled to said second data bus of said storage device;
a ninth set of logic gates each having a first input, a second input and an output, said first inputs being coupled to said third data bus of said second register and said second inputs being coupled to said strobe line of said programming circuit means; and
a second array having a reset, a first data bus, a second data bus and a third data bus, said reset being coupled to said reset of said programming circuit means, said first data bus being coupled to said outputs of said eighth set of logic gates, said second data bus being coupled to said outputs of said ninth set of logic gates and said third data bus being coupled to said second data bus of said programming circuit means.

8. The program security device of claim 7 wherein said first control gate, said second control gate, said seventh set of logic gates and said ninth set of logic gates are comprised of dual input AND gates.

9. The program security device of claim 8 wherein said second set of logic gates, said fourth set of logic gates and said eighth set of logic gates are comprised of dual input exclusive OR gates.

10. The program security device of claim 9 wherein said first set of logic gates, said third set of logic gates and said plurality of sixth logic gates are comprised of bidirectional transmission gates.

11. A program security device, having an external and an internal data bus, comprising:
bidirectional bypass means for coupling said external and internal data buses, said bidirectional bypass means having a plain text data select, a first data bus and a second data bus, said plain text data select being coupled to receive a plain text data signal, said first data bus being coupled to said external data bus of said program security device and said second data bus being coupled to said internal data bus of said internal program security device;
conditional bidirectional inverter means for combining input data with a variable, said conditional bidirectional inverter having an output enable, an input enable, a cipher text data select, a first data bus, a second data bus and a variable input bus, said output enable being coupled to receive an output enabling signal, said input enable being coupled to receive an input enabling signal, said ciphered text data select being coupled to receive a ciphered text data signal and said first data bus being coupled to said external data bus of said program security device;
bidirectional permutor means for rearranging data bus lines, said permutor having a reset, a first data bus, a second data bus, a first program bus and a second program bus, said reset being coupled to receive a reset signal, said first data bus being coupled to said internal data bus of said program security device and said second data bus being coupled to said third data bus of said conditional bidirectional inverter means;

a seventh set of logic gates each having a first input, a second input and an output, said first inputs being coupled to a strobe line for receiving a strobe signal and said outputs being coupled to said fourth data bus of said permutor means;

a first register means having a first data bus and a second data bus, said first data bus being coupled to said second inputs of said seventh set of logic gates and said second data bus being coupled to a processor;

a storage device having a first data bus, a second data bus and a third data bus, said first data bus being coupled to said first data bus of said first register;

an eighth set of logic gates each having a first input, a second input and an output, said second inputs being coupled to said second data bus of said storage device;

a second register having a first data bus, a second data bus and a third data bus, said first data bus being coupled to said processor, said second data bus being coupled to said third data bus of said storage device and said third data bus being coupled to said first inputs of said eighth set of logic gates;

a decoder having a first data bus and a second data bus, said first data bus being coupled to said outputs of said eighth set of logic gates and said second data bus being coupled to said third data bus of said permutor means;

a ninth set of logic gates each having a first input, a second input and an output, said first inputs being coupled to said second data bus of said second register and said second inputs being coupled to said strobe line; and a second array having a first data bus, a second data bus, a third data bus and a reset, said reset being coupled to receive said reset signal, said first data bus being coupled to said second data bus of said decoder, said second data bus being coupled to said outputs of said ninth set of logic gates and said third data bus being coupled to said second data bus of said conditional bidirectional inverter means.

12. The program security device of claim 11 wherein said conditional bidirectional inverter means comprises:

a first control gate having a first input, a second input and an output, said first input being coupled to said ciphered data select and said second input being coupled to said input enable;

a second control gate having a first input, a second input and an output, said first input being coupled to said ciphered data select and said second input being coupled to said output enable;

a first set of logic gates each having an input, an output and an enable, said enables being coupled to said output of said first control gate and said outputs being coupled to said second input/output bus of said conditional bidirectional inverter means;

a second set of logic gates each having a first input, a second input, and an output, said first inputs being coupled to said external data bus of said conditional bidirectional inverter means, said second inputs being coupled to said variable input bus of said conditional bidirectional inverter means and said outputs being coupled to said inputs of said first set of logic gates;

a third set of logic gates each having an input, an output and an enable, said enables being coupled to said output of said second control gate and said outputs being coupled to said external data bus of said program security device; and a fourth set of logic gates each having a first input, a second input and an output, said first inputs being coupled to said second input/output data bus of said conditional bidirectional inverter means, said second inputs being coupled to said variable input bus of said conditional bidirectional inverter means and said outputs being coupled to said inputs of said third set of logic gates.

13. The security device of claim 12 wherein said bidirectional permutor means comprises a first array having a reset, a first data bus, a second data bus, a third data bus and a fourth data bus, said reset being coupled to receive a reset signal, said first data bus being coupled to said first data bus of said bidirectional permutor means, said second data bus being coupled to said second data bus of said bidirectional permutor means, said third data bus being coupled to said first program bus of said bidirectional permutor means and said fourth data bus being coupled to said second program bus of said bidirectional permutor means.

14. The program security device of claim 13 wherein said first array comprises a plurality of fifth logic gates each having a reset, a first input/output, a second input/output, a first program line and a second program line, said first reset lines being coupled to said reset of said first array, said first input/output lines being coupled to said first data bus of said first array, said second input/output lines being coupled to said second data bus of said first array, said first program lines being coupled to said first program bus of said first array and said second program lines being coupled to said second program bus of said first array.

15. The program security device of claim 14 wherein said bidirectional bypass means comprises a plurality of fixed logic gates each having an enable, a first input/output line and a second input/output line, said enables being coupled to said plain text data select, said first input/output lines being coupled to said external data bus of said program security device and said second input/output lines being coupled to said internal data bus of said program security device.

16. The program security device of claim 15 wherein said first control gate, said second control gate, said seventh set of logic gates and said ninth set of logic gates are comprised of dual input AND gates.

17. The progam security device of claim 16 wherein said second set of logic gates, said fourth set of logic gates and said eighth set of logic gates are comprised of dual input exclusive OR gates.

18. The program security device of claim 17 wherein said first set of logic gates, said third set of logic gates and said plurality of sixth logic gates are comprised of bidirectional transmission gates.

* * * * *